United States Patent
Profetto

(12) 
(10) Patent No.: US 6,786,960 B2
(45) Date of Patent: Sep. 7, 2004

(54) STOP-LEAK COMPOSITION FOR INTERNAL COMBUSTION ENGINES

(75) Inventor: Michael S. Profetto, Burr Ridge, IL (US)

(73) Assignee: Gold Eagle Co., Chicago, IL (US)

( * ) Notice: Subject to any disclaimer, the term of this patent is extended or adjusted under 35 U.S.C. 154(b) by 0 days.

(21) Appl. No.: 10/254,583

(22) Filed: Sep. 26, 2002

(65) Prior Publication Data

US 2004/0060475 A1 Apr. 1, 2004

(51) Int. Cl.7 ................................................. C09K 3/12
(52) U.S. Cl. ...................... 106/33; 106/164.01; 252/72
(58) Field of Search ............................. 106/33, 164.01; 252/72

(56) References Cited

U.S. PATENT DOCUMENTS

| | | | |
|---|---|---|---|
| 3,218,776 A | | 11/1965 | Cloud |
| 4,348,235 A | | 9/1982 | Lasswell et al. |
| 4,662,940 A | | 5/1987 | Monier |
| 5,763,367 A | * | 6/1998 | Burts, Jr. ..................... 507/104 |
| 6,322,737 B1 | * | 11/2001 | Beyer ......................... 264/122 |

* cited by examiner

*Primary Examiner*—Michael Marcheschi
(74) *Attorney, Agent, or Firm*—George H. Gerstman; Seyfarth Shaw LLP

(57) ABSTRACT

A stop-leak composition for the cooling system of an internal combustion engine and the like may comprise a powdered mixture of ground wood, optionally with ginger rhizome powder, with the above being mixed with ground nutshells. The composition may be packaged in polyvinyl alcohol film. Also, a stop-leak composition tablet may be prepared from powdered purified cellulose, ground nutshells, and ginger rhizome powder, formed into a solid tablet. Either of these items may be placed into the radiator of a vehicle. The bag and the tablet each dissolve, and the contents spontaneously disperse into the radiator coolant to seal pin hole leaks.

36 Claims, 1 Drawing Sheet

STOP-LEAK COMPOSITION FOR INTERNAL COMBUSTION ENGINES

BACKGROUND OF THE INVENTION

This invention pertains to a stop-leak composition for cooling systems of internal combustion engines and the like. The composition is placed into the liquid of the cooling system, in which it disperses. In the event of a pinhole leak, the composition in drawn to the leak to plug it in a spontaneous manner.

Precursor compositions are found in the prior art, as described in U.S. Pat. Nos. 4,348,235 and 4,662,940. Specifically, compositions of the prior art comprise a mixture of ginger rhizome powder mixed with ground nut shells, and typically including other additives such as boric acid, magnesium stearate, and sodium lignin sulfonate.

By this invention, significantly improved formulations are provided which exhibit better sealing characteristics at a significantly reduced materials cost. Also, some formulations of this invention are readily formed into non-friable tablets which do not readily crumble or chip on handling, but which easily disperse when placed into the aqueous environment of a liquid cooling system for an internal combustion engine, to provide the desired sealing characteristics. Furthermore, preferred products of this invention do not discolor the specific commercially available radiator coolant liquids, which typically carry a bright, characteristic color. Also, the preferred compositions of this invention do not significantly react with the coolant inhibitor package.

DESCRIPTION OF THE INVENTION

By one aspect of this invention, a stop-leak composition is provided for cooling systems of internal combustion engines and the like. The stop-leak composition consists essentially of a powder comprising from 25 to 100 weight percent of ground wood or substantially pure cellulose powder, any balance of the powder comprising ginger rhizome powder. This is preferably mixed with ground nut shells, typically pecan, almond, or other hardwood nut shells. The ground wood/cellulose, and ginger rhizome powder when present, may preferably be present in the final formulation in an amount of 40 to 95 weight percent, while the ground nut shells are preferably present in an amount of about 5 to 60 weight percent.

Other additives may also be present as desired, for example the additives disclosed in the previously cited patents such as boric acid powder, typically present in an amount of 1.5 to 3.5 weight percent; an alkali metal lignin sulfonate such as sodium lignin sulfonate, typically present in an amount of 3 to 6 weight percent; or an alkaline earth soap such as magnesium stearate, typically present in an amount of 0.5 to 2 weight percent. However, these optional ingredients are not necessary for all applications and, in fact, may be absent from currently-preferred compositions.

It is also currently preferred in some embodiments for the ground wood to be present in the amount of about 100 weight percent of the above-stated powder, with the ginger rhizome being essentially absent. By this invention, it has been found that the ground wood, preferably ground hardwood, operates as well or better as an ingredient along with ground nut shells, when compared with the ginger rhizome powder, but the ground hardwood used has a cost per pound which is on the order of one eighth the cost of the ginger rhizome powder. The mixture of the ground wood and the nutshells provide an effective, water dispersable, leak-sealant composition, optionally without the use of other additives. The ground wood may preferably be present in the amount of 40 to 70 weight percent, the balance being ground nut shells.

The ground nut shells provide a desirable abrasive action on the water pump seals of the cooling system, to remove precipitated deposits of carbonate and the like.

The ground wood provides much of the sealing capability, to close off small leaks from the cooling system.

Some of the additives of the prior art can be dispensed with because the composition of this invention comprising a mixture of ground wood and ground nut shells can, by this invention, be sealed as a loose powder in a water soluble film package such as polyvinyl alcohol and thus does not need to be formed into a unitary mass. This packaging may be accomplished in a conventional manner with known package forming machines, for example, in accordance with the packaging method and apparatus illustrated in Cloud, U.S. Pat. No. 3,218,776. Such packages are easily stored and handled, and may simply be dropped into the liquid cooling system of the internal combustion engine that is to be protected. This may be done during the manufacturing process if desired, or later in the life of the motor. Alternatively, the packaging may be formed from other water soluble plastics.

When the package comes into contact with the aqueous coolant, the polyvinyl alcohol or other soluble outer film quickly dissolves, and the contents of the container are dispersed in a fairly uniform manner throughout the aqueous coolant, especially when the motor is operating. The powder can be dispersed into the radiator water/coolant mixture in about fifteen to thirty seconds.

Typically, about nine or ten grams of the composition of this invention may be optimally added to a conventional radiator system having about 12–16 liters of coolant. Proportionally greater or lesser amounts may preferably be added to larger or smaller radiator systems.

As for particle sizes, the preferred powdered materials used in the compositions of this invention should pass through about a #30 mesh screen, but not be passed by about a #180 mesh screen, so that the finest particles are generally excluded. Such a particle distribution is optimal for avoidance of plugging the radiator or heater core, while being suitable to plug pin hole and other small leaks. The words "#30 mesh" and "#180 mesh" refer to strands per inch.

In another embodiment of this invention, a tablet of stop-leak composition may be provided. These tablets resist crumbling on shipment, but readily disperse in the coolant of a radiator, and readily plug small leaks of the various possible kinds when they form.

Other forms for dispensing the compositions of this invention could include a bottle or tube from which the powder is poured into the radiator, or a liquid/powder blend in a container.

The composition of such a tablet preferably consists essentially of a mixture of 5–30 weight percent of powdered purified cellulose; 25 to 60 weight percent of ground nut shells; and 30 to 70 weight percent of ginger rhizome powder, ground wood, or a mixture thereof.

The powdered, purified cellulose may be microcrystalline cellulose, to serve as a binder. For example, such a product is sold by the Pennwest Pharmaceutical Company under the trademark Emcocel—LP200.

The ground nutshells in this and in the previous embodiment may typically comprise pecan nut shells, although other hardwood nut shells such as walnuts may also be ground up and used.

The ground wood in both of these embodiments is preferably a hardwood such as oak or maple, but softer woods such as pine or spruce may be used as well. Maple is preferred since it does not discolor commercial antifreeze.

The ginger rhizome powder is also commercially available, being a manufacturing by-product of ginger as a spice.

The preferred particle size range for the ground nut shells, ginger rhizome, and ground woods is as indicated above.

The above tablet-forming composition may be formed into a tablet weighing typically about 5–15 grams by simple pressure, with the cellulose providing good binding in the well-mixed composition. A typical tablet may be a cylinder of about 25 mm. diameter and 25 mm. length. Typically, pressures in conventional tablet-forming equipment may be applied on the order of 15 to 40 tons per square inch.

DESCRIPTION OF SPECIFIC EMBODIMENTS

Figure 1:
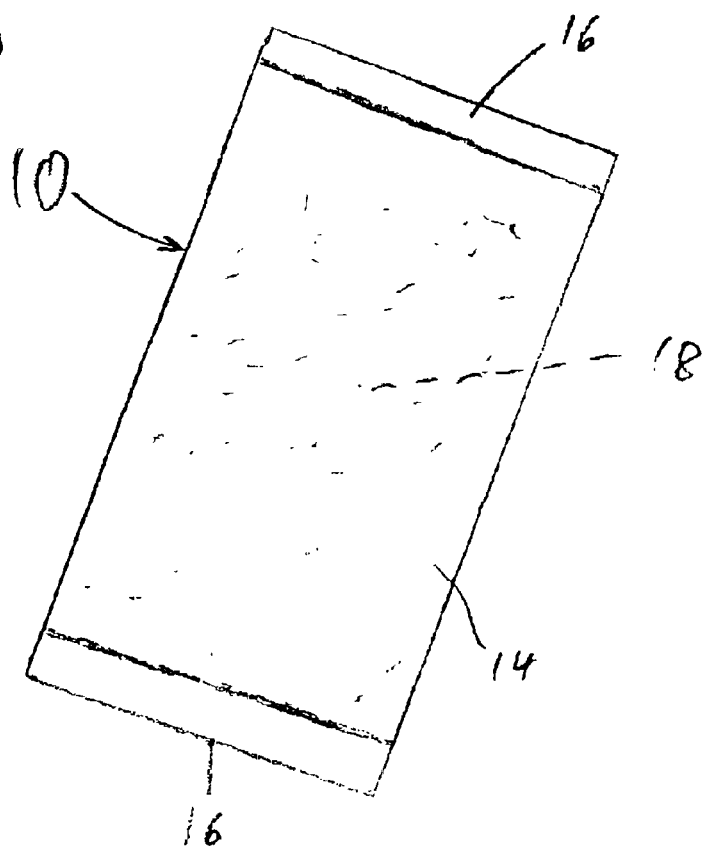
FIG. 1 is a perspective view of a sealed envelope containing a stop-leak composition of this invention.

Referring to FIG. 1, a sealed package 10 comprises a sealed outer film of commercially-available polyvinyl alcohol film 14, sealed at ends 16 and being of flattened tubular configuration. Package 10 contains about nine to ten grams of the loose, particulate composition 18 of this invention, specifically comprising fifty percent by weight of ground hardwood (such as maple) and fifty percent by weight of ground pecan shells, well mixed together, and having the preferred particle size range stated above.

When such a sealed envelope is dropped into the radiator system of a conventionally sized automobile, it quickly dissolves and, as the motor is running, it is circulated throughout the cooling system. If and when pinholes form in the cooling flow path, the particulate mixture quickly forms a sealing mass at the pin hole, plugging the leak.

Figure 2:
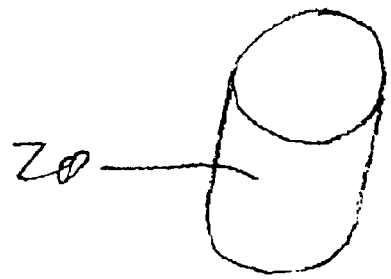
FIG. 2 is a tablet which comprises a stop-leak composition of this invention.

Referring to FIG. 2, a tablet 20 is shown comprising about nine or ten grams of a particulate, well-mixed formula comprising 50 weight percent of ginger rhizome flour; 30 weight percent of ground nut shell (pecan); and 20 weight percent of purified, finely powdered cellulose (Emocel LP-200). This composition is pressed in a tablet-forming die to a pressure of about 30 tons per square inch, to form a sturdy tablet which resists crumbling and breakage during shipping. However, when tablet 20 is dropped into the radiator of a standard-sized automobile with the engine running, it quickly disperses throughout the entire liquid coolant, and effectively plugs pinholes as they form, whether the pinholes are breakages in hose walls or elsewhere, or open areas in the connection between the hoses and the metal end mountings of the radiator, by clogging the outward flow path of the pinhole. The particle size range is as above.

Other formulations may comprise powders, which can be placed in a sealed pouch of polyvinyl alcohol film, including the following:

Amounts are expressed in weight percent.

| | Ginger Rhizome Flour | Hardwood Sawdust | Ground Nutshells |
| --- | --- | --- | --- |
| Formulation No. 1 | 0 | 95 | 5 |
| No. 2 | 5 | 60 | 35 |
| No. 3 | 15 | 30 | 35 |
| No. 4 | 25 | 40 | 35 |
| No. 5 | 50 | 25 | 25 |

These formulations all disperse in radiator fluid and plug pin hole leaks as they form.

Other formulations which can be used in the preparation of a tablet of the stop-leak composition of this invention are as follows (expressed in weight percent):

| | Ginger Rhizome Flour | Ground Nutshells | Powdered Cellulose (Emocell P 200) |
| --- | --- | --- | --- |
| Formulation No. 6 | 60 | 30 | 10 |
| No. 7 | 50 | 35 | 15 |
| No. 8 | 40 | 40 | 20 |

Ten gram tablets of the above mixed powders can be prepared by conventional compression, as described above, to provide non-friable tablets weighing about 10 grams each, which tablets may be placed into a vehicle radiator to disperse in the radiator fluid, and to plug pin hole leaks as they occur.

The above has been offered for illustrative purposes only, and is not intended to limit the scope of the invention of this application, which is as defined in the claims below.

That which is claimed is:

1. A stop-leak composition for the cooling system of an internal combustion engine, consisting essentially of a powder comprising from 25 to 100 weight percent of ground wood, any balance comprising ginger rhizome powder, said powder being mixed with ground nutshells.

2. The composition of claim 1 in which said ginger rhizome powder is essentially absent.

3. The composition of claim 2 in which said ground wood is hardwood.

4. The composition of claim 3, enclosed in a water soluble plastic film package.

5. The composition of claim 1 in which said ground wood is hardwood.

6. The composition of claim 1 in which said ground wood/ginger rhizome powder is present in an amount of 40 to 95 weight percent, and said ground nutshells are present in an amount of 5 to 60 weight percent.

7. The composition of claim 6 in which said ground wood is hardwood.

8. The composition of claim 7 in which said ginger rhizome powder is essentially absent.

9. The composition of claim 7 in which the powders present are of a particle size capable of passing a #30 mesh screen but not a #180 mesh screen.

10. The composition of claim 1 in which the powders present are of a particle size capable of passing a #30 mesh screen but not a #180 mesh screen.

11. The composition of claim 1, enclosed in a water soluble plastic film package.

12. The packaged composition of claim 11 in which said water soluble plastic film package comprises polyvinyl alcohol.

13. The packaged composition of claim 12 in which said ginger rhizome is essentially absent.

14. The composition of claim 13 in which said ground wood is hardwood.

15. The composition of claim 14 in which said ground nutshells are present in an amount of 5 to 60 weight percent.

16. The composition of claim 10 in which said ground wood is maple.

17. A stop-leak composition for the cooling system of an internal combustion engine, consisting essentially of 5 to 30 weight percent of powdered purified cellulose; 25 to 60 weight percent of ground nutshells; and 30 to 70 weight percent of a ginger rhizome powder.

18. The composition of claim 17 which is in the form of a solid tablet.

19. The composition of claim 18 in which the ground nut shells and ginger rhizome powder are of a particle size capable of passing a #30 mesh screen but not a #180 mesh screen.

20. A stop-leak composition in tablet form for the cooling system of an internal combustion engine, said tablet consisting essentially of a mixture of purified powdered cellulose, ground nutshells, and ginger rhizome powder.

21. The tablet of claim 20 having a weight of 5 to 20 grams.

22. The composition of claim 20 in which the ground nutshells and ginger rhizome powder are of a particle size capable of passing a #30 mesh screen but not a #180 mesh screen.

23. A stop-leak composition for the cooling system of an internal combustion engine, said composition consisting essentially of a powdered mixture of (1) ground nutshells and (2) ginger rhizome powder and/or powdered wood, said mixture being sealed within a water soluble film package.

24. A stop-leak composition for the cooling system of an internal combustion engine, said composition consisting essentially of (1) from 40 to 95 weight percent of a cellulosic powder consisting essentially of from 25 to 100 weight percent of ground wood or purified cellulose powder, any balance of the powder comprising ginger rhizome powder, and (2) ground nutshells present in an amount of about 5 to 60 weight percent, based on the entire composition.

25. The composition of claim 24, having a particle size range between about #30 mesh and #180 mesh.

26. The stop-leak composition of claim 24 in which said cellulosic powder comprises at least about 15 weight percent of purified cellulose powder and no more than about 60 weight percent ginger rhizome powder.

27. The stop-leak composition of claim 24 which is in the form of a solid tablet having a weight of substantially 5 to 15 grams.

28. A stop leak composition for the cooling system of an internal combustion engine which consists essentially of a mixture of ground nutshells and ginger rhizome powder, said mixture capable of passing through a #30 mesh screen but not a #180 mesh screen, said composition being formed into a tablet and containing sufficient purified, powdered cellulose as a binder, to permit the tablet to remain a solid, unitary structure while dry.

29. The tablet of claim 28 which consists essentially of 40 to 60 weight percent of ginger rhizome flour, 30 to 40 weight percent of ground nutshells, and 10 to 20 percent of said powdered cellulose.

30. The tablet of claim 28 in which said cellulose powder is microcrystalline cellulose powder.

31. The stop leak composition of claim 24 in which said cellulosic powder consists essentially of microcrystalline cellulose powder.

32. The tablet of claim 20 in which said purified powdered cellulose comprises microcrystalline cellulose powder.

33. The method of stopping a leak in a cooling system using flowing liquid coolant, which comprises:

placing into said cooling system a powder comprising from 25 to 100 weight percent of ground wood, any balance comprising ginger rhizome powder, said powder being mixed with ground nutshells.

34. The method of claim 33 in which said powder present is of a particle size capable of passing a #30 mesh screen but not a #180 mesh screen.

35. The method of stopping a leak in a cooling system using flowing liquid coolant, which comprises:

placing into said cooling system a composition which consists essentially of a mixture of ground nutshells and ginger rhizome powder, said mixture capable of passing through a #30 mesh screen but not a #180 mesh screen, said composition being formed into a tablet and containing sufficient purified, powdered cellulose as a binder to permit the tablet to remain a solid, unitary structure while dry.

36. The method of stopping a leak in a cooling system using flowing liquid coolant which comprises:

placing into said cooling system a composition consisting essentially of (1) from 40 to 95 weight percent of a cellulosic powder consisting essentially of from 25 to 100 weight percent of ground wood or purified cellulose powder, any balance of the powder comprising ginger rhizome powder, and (2) ground nutshells present in an amount of about 5 to 60 weight percent, based on the entire composition.

* * * * *